United States Patent [19]
Johnson

[11] Patent Number: 6,113,105
[45] Date of Patent: Sep. 5, 2000

[54] ROTARY SHAFT BEARING ISOLATOR SEAL FOR DRY COMMINUTED MATERIALS

[75] Inventor: Norman R. Johnson, Panama City, Fla.

[73] Assignee: Merrick Industries, Inc., Lynn Haven, Fla.

[21] Appl. No.: 09/075,755

[22] Filed: May 11, 1998

[51] Int. Cl.⁷ .................................................. F16J 15/447
[52] U.S. Cl. ........................... 277/412; 277/418; 277/419
[58] Field of Search .................................. 277/411, 412, 277/418, 419

[56] References Cited

U.S. PATENT DOCUMENTS

| | | |
|---|---|---|
| 3,072,957 | 1/1963 | Blackburn . |
| 3,897,070 | 7/1975 | Anderson et al. ............ 15/16 |
| 3,960,381 | 6/1976 | Piotrowski ................. 15/34 |
| 4,817,966 | 4/1989 | Borowski .................. 15/16 |
| 4,852,890 | 8/1989 | Borowski .................. 15/34 |
| 5,024,451 | 6/1991 | Borowski . |
| 5,290,047 | 3/1994 | Duffee et al. ............ 277/419 |
| 5,378,000 | 1/1995 | Orlowski ............... 277/425 X |

*Primary Examiner*—Peter M. Cuomo
*Assistant Examiner*—Karlena Schwing
*Attorney, Agent, or Firm*—John L. Gray, Esq.; Kegler, Brown, Hill & Ritter

[57] ABSTRACT

A rotary shaft bearing isolator seal where the shaft extends into dry comminuted material providing a stator having a very small tolerance between the rotor on the shaft and the stator containing downwardly sloping circular portions adjacent complimentary inwardly extending and outwardly extending portions of said rotor.

5 Claims, 1 Drawing Sheet

ROTARY SHAFT BEARING ISOLATOR SEAL FOR DRY COMMINUTED MATERIALS

BACKGROUND OF THE INVENTION n loss-in-weight feeder devices or batchers where a shaft rotates operating a helical screw to discharge dry comminuted materials, maintaining a seal so that the dry materials do not leak past the shaft bearing is a problem. The current devices used to prevent such leakage from happening involve a friction type seal such as an 'O' ring or a lip seal, etc., in a non-lubricated environment on the dry material side of the container. The seal is fixed in the housing and the shaft rotates in the seal against the sealing surface. Due to high friction and the absence of a lubricant, seal wear is excessive due to abrasion and heat build up. This ultimately leads to premature seal failure (in some cases only a few days) which then allows the material to leak out of the container. The result is increased maintenance cost and degraded system reliability.

BRIEF SUMMARY OF THE INVENTION

Applicant overcomes these disadvantages by utilizing a seal rotor which is affixed to the rotating shaft by one or more 'O' rings which also rotate with the rotor. The dry comminuted material cannot pass the 'O' rings which connect the rotor to the shaft and can only migrate around the rotor to reach the other side. The rotor and the complimenting portion of the stator are so configured that any fine material which could get past the close tolerances between the rotor and the stator are prevented from further migration by centrifugal force which causes such fine particles to be trapped in one or more sections of the stator and thus are prevented from migrating around the rotor to reach the other side. Eventually with extremely fine abrasive materials, the material will migrate around the rotor, but most dry comminuted material will be prevented from such migration.

It is therefore an object of this invention to provide a rotary shaft bearing isolator seal where the shaft extends into dry comminuted material and the seal virtually eliminates any migration of the dry material to the open side of the stator.

This, together with other objects of the invention, will become apparent from the following detailed description of the invention and the accompanying drawings.

DETAILED DESCRIPTION OF THE INVENTION

Figure 1:
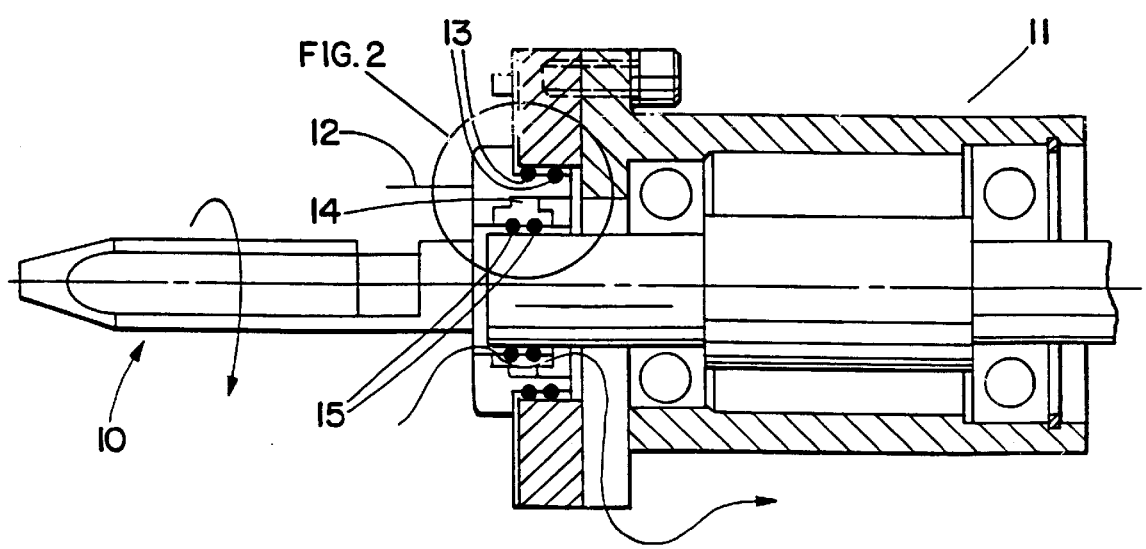
FIG. 1 is a side elevation view of the rotating shaft in the bearing housing which is shown partly in section showing the position of the seal rotor and the seal stator.

Referring now to FIG. 1, there is shown a rotating shaft 10 which may be connected to an Archimedes type screw feeder and which extends into the dry comminuted material. The rotating shaft 10 operates in a fixed bearing housing 11 which contains a stator 12 connected to said housing by 'O' rings 13—13. The seal rotor 14 likewise is connected to the shaft by 'O' rings 15—15.

Figure 2:
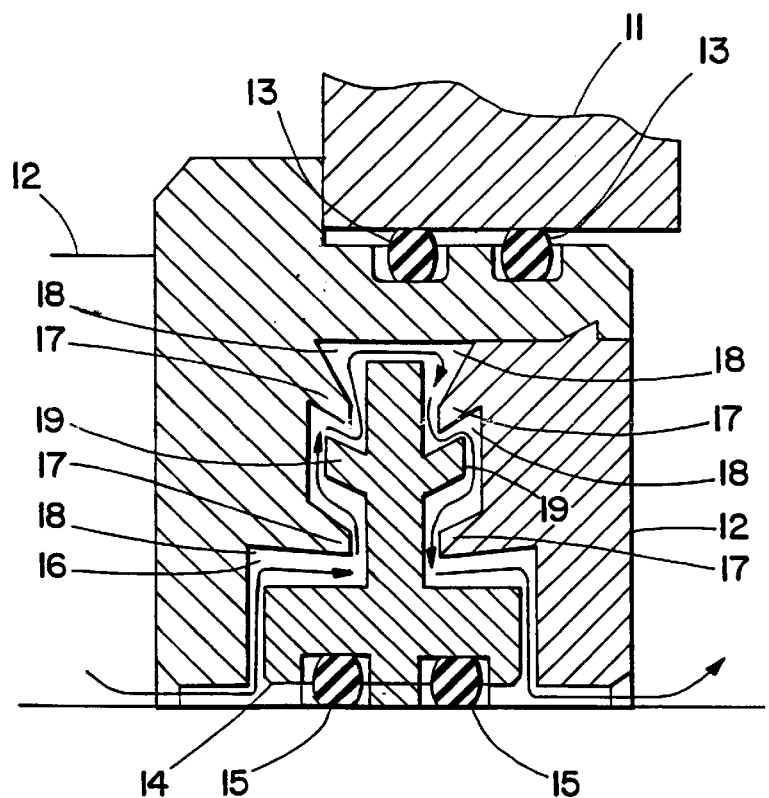
FIG. 2 is a sectional view of the seal stator and the seal rotor shown in section on the upper side of the shaft in FIG. 1.

This is shown in more detail in FIG. 2. It should be noted that the stator 12 is provided with a circular opening 16 which encircles the shaft and contains a plurality of downwardly sloping circular sections 17—17. These provide entrapment areas 18—18 whose purpose will be explained hereafter. The stator 12 has outwardly extending circular members 19—19 which fit between the downwardly sloping portions 17—17. The tolerance between the rotor 14 and the stator 12 is very small, usually in the order of 0.010–0.015 inches. Thus, only extremely fine particles have the opportunity to migrate from the material side of the seal to the air side of the seal. In doing so it is necessary for them to pass underneath the area where the stator 12 is slightly spaced from the shaft 10. The 'O' rings 15—15 prevent migration. Because of the extremely fine tolerance between the rotor and the stator, only very fine particles usually involving abrasive materials, will start to migrate around the rotor 14. However, centrifugal force of the rotor 14 will tend to throw such fine particles into the spaces 18—18 in various locations on the stator 12 thus preventing further migration. This migration is limited as the fine particles move outward from the shaft 10 on the material side of the rotor 14 and the same centrifugal force limits their movement on the air side of the rotor 14 because of the comparable trapping areas 18—18.

Eventually, with extremely fine abrasive materials, the material will migrate around the rotor 14. When this happens the material will present itself at the slot at the rear of the seal alerting the user that seal replacement is necessary.

While this invention has been shown and described with respect to a detailed embodiment thereof, it will be understood by those skilled in the art that various changes in form and detail thereof may be made without departing from the scope of the claims of the invention.

What is claimed is:

1. A rotary shaft bearing isolator seal assembly, wherein said shaft is adapted to extend into dry comminuted material, comprising:
    a stator surrounding said shaft,
    said stator being provided with a circular opening therein at right angles to said shaft,
    a circular rotor securely attached to said shaft and of a size and shape to rotate within said circular opening in said stator,
    said circular opening in said stator being provided with a plurality of inwardly extending circular portions sloping toward said shaft,
    said rotor being provided with a plurality of inwardly extending circular portions sloping away from said shaft and being of a size and shape so as to fit between adjacent pairs of said inwardly extending circular portions in said circular opening in said stator,
    said inwardly extending portions of said stator not touching any portion of said rotor and
    said outwardly extending portions of said rotor not touching any portion of said stator.

2. The rotary shaft bearing isolator seal assembly of claim 1 wherein the tolerance between said rotor and said stator is small enough that the majority of the dry comminuted material particles into which said shaft is adapted to extend will not fit between the said rotor and said stator.

3. The rotary shaft bearing isolator seal assembly of claim 2 wherein said rotor is secured to said shaft by a plurality of 'O' rings.

4. The rotary shaft bearing isolator seal assembly of claim 1 wherein said rotor is attached to said shaft by means of a plurality of 'O' rings.

5. The rotary shaft bearing isolator seal assembly of claim 1 comprising in addition thereto:
    a bearing housing, said bearing housing surrounding said stator and being connected thereto by a plurality of 'O' rings.

* * * * *